United States Patent
Yulizar et al.

(10) Patent No.: US 9,177,607 B2
(45) Date of Patent: Nov. 3, 2015

(54) LOGGING DISK RECOVERY OPERATIONS IN A NON-VOLATILE SOLID-STATE MEMORY CACHE

(75) Inventors: Yunaldi Yulizar, Shakopee, MN (US); Akhila Tadinada, Redmond, WA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 208 days.

(21) Appl. No.: 13/473,435

(22) Filed: May 16, 2012

(65) Prior Publication Data

US 2013/0308433 A1  Nov. 21, 2013

(51) Int. Cl.
| | | |
|---|---|---|
| *G11B 5/012* | (2006.01) | |
| *G11B 27/36* | (2006.01) | |
| *G11B 19/04* | (2006.01) | |
| *G11B 20/18* | (2006.01) | |
| G11B 20/10 | (2006.01) | |

(52) U.S. Cl.
CPC .............. *G11B 27/36* (2013.01); *G11B 19/047* (2013.01); *G11B 19/048* (2013.01); *G11B 20/1883* (2013.01); *G11B 2020/10657* (2013.01)

(58) Field of Classification Search
CPC ........... G11B 19/048; G11B 20/00963; G11B 2020/1826; G11B 20/1883; G11B 2020/10657; G11B 19/047
USPC ................ 360/39, 55, 31, 53, 54; 714/6.3, 48
See application file for complete search history.

(56) References Cited

U.S. PATENT DOCUMENTS

| | | | | |
|---|---|---|---|---|
| 5,546,556 | A | * | 8/1996 | Matsushita .................... 711/100 |
| 5,671,390 | A | | 9/1997 | Brady et al. |
| 6,118,608 | A | * | 9/2000 | Kakihara et al. ................. 360/53 |
| 6,119,209 | A | * | 9/2000 | Bauman et al. ................ 711/162 |
| 6,654,193 | B1 | * | 11/2003 | Thelin .............................. 360/53 |
| 7,730,153 | B1 | | 6/2010 | Gole et al. |
| 7,822,932 | B2 | | 10/2010 | Fachan et al. |
| 8,004,785 | B1 | * | 8/2011 | Tsai et al. ......................... 360/53 |
| 2002/0181133 | A1 | * | 12/2002 | Koshkina et al. ................ 360/53 |
| 2002/0191319 | A1 | * | 12/2002 | Liew et al. ........................ 360/53 |
| 2004/0128581 | A1 | * | 7/2004 | Yoshida ............................ 714/5 |
| 2005/0038958 | A1 | | 2/2005 | Jadon et al. |
| 2006/0101085 | A1 | | 5/2006 | Soulier et al. |
| 2007/0281793 | A1 | | 12/2007 | Sylla |
| 2008/0130156 | A1 | * | 6/2008 | Chu et al. ......................... 360/71 |
| 2008/0144209 | A1 | * | 6/2008 | Maruchi et al. .................. 360/75 |
| 2012/0271998 | A1 | * | 10/2012 | Galloway et al. .............. 711/114 |

\* cited by examiner

*Primary Examiner* — Thomas Alunkal
(74) *Attorney, Agent, or Firm* — Hollingsworth Davis, LLC

(57) ABSTRACT

An apparatus includes a controller capable of being coupled to a magnetic data storage media and a cache. The cache includes non-volatile, solid-state memory. The controller is configured to detect a defect in the data storage media requiring a recovery operation and allocate a portion of the cache for storage of a journal to be used in the recovery operation. The controller is further configured to log steps of the recovery operation to the journal.

20 Claims, 5 Drawing Sheets

LOGGING DISK RECOVERY OPERATIONS IN A NON-VOLATILE SOLID-STATE MEMORY CACHE

SUMMARY

The present disclosure is related to systems and methods that facilitate logging recovery operations. In one embodiment, an apparatus includes a controller capable of being coupled to a magnetic data storage media and a cache. The cache includes non-volatile, solid-state memory. The controller is configured to detect a defect in the data storage media requiring a recovery operation and allocate a portion of the cache for storage of a journal to be used in the recovery operation. The controller is further configured to log steps of the recovery operation to the journal.

In another embodiment, a controller of an apparatus is configured to determine one or more addresses ranges associated with sectors of the data storage media requiring a recovery operation. A portion of the cache is allocated by the controller for storage of a journal to be used in the recovery operation. The controller is configured to log the address ranges to the journal, and for each range of the address ranges, perform the recovery operation on the range and log a completion of the recovery operation to the journal.

These and other features and aspects of various embodiments may be understood in view of the following detailed discussion and accompanying drawings

BRIEF DESCRIPTION OF THE DRAWINGS

In the following diagrams, the same reference numbers may be used to identify similar/same components in multiple figures.

DETAILED DESCRIPTION

Figure 1:
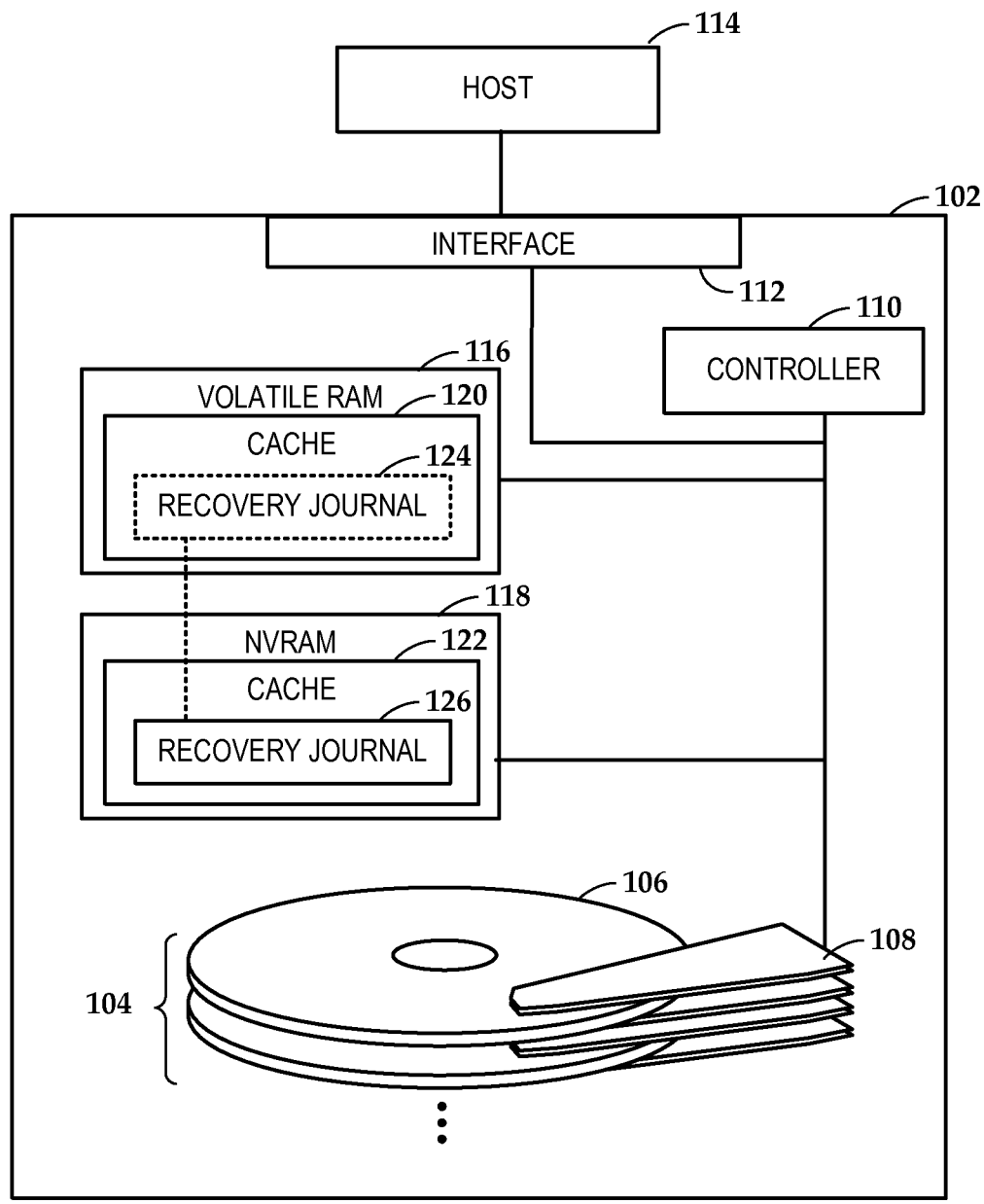
FIG. 1 is a block diagram of an apparatus according to an example embodiment.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to data recovery in data storage devices such as hard drives, hybrid drives, and solid state drives. In response to detecting a recoverable defect in storage media, a recovery operation is performed. A portion of a non-volatile (NV) memory is reserved for use in the recovery operation, such as for storing a journal of the recovery. Steps of the recovery operation are stored in the journal. If the recovery operation is interrupted (e.g., due to system power loss or reset), the recovery operation can be continued based on what is stored in the journal.

In a data storage device such as a disc drive, recoverable defects may be categorized as soft and hard defects. Soft defects include errors where data may still be read correctly, but the quality of the signal representing the data may be below nominal values. Soft defects may be caused by phenomena such as side track erasure (STE), adjacent track interference, transient weak write, etc. A soft defect may be repaired by scrubbing or refresh, which involves rewriting the data in the same location, either with or without first erasing the data.

A hard defect includes errors where the data may be recovered (e.g., sub-par but usable signal quality, bit errors that can be overcome using error correction codes, etc.), but where operations such as scrubbing or refresh do not cure the defect. A hard defect may be caused by effects such as a damaged or degraded region of the media. Repairing a hard defect may involve moving/reallocating the data associated with defective media regions to a new location. Upon successful relocation, the defective regions may be marked/flagged so that no further data is allowed to be stored at the region.

For purposes of this disclosure, the smallest individually addressable element will be referred to as a "sector," which generally corresponds to the terminology used to describe hard disk drive data storage units. However, the concepts described regarding sectors may also apply to storage units of other data storage media, such as page of solid-state NV memory. The concepts applicable to conventional hard disk sectors may also apply to alternate track writing approaches that use magnetic disks for storage, such as shingle magnetic recording (SMR). In an SMR drive, data is written in cylindrical portions that each include a number of overlapping tracks. These cylindrical portions are generally larger than conventional hard drive sectors and must be written as a unit due to the overlapping way the portions written. An SMR drive can have increased areal density with acceptable random read performance compared to a conventional hard drive, with the tradeoff that random write and erase operations may take a longer time than a conventional hard drive.

The hard or soft data repair procedures described herein may be performed on single sector, and/or one or more ranges of sectors. An interruption during the repair operation, such as caused by unexpected power loss, could cause data readability issues, e.g., due to an incomplete or interrupted write. The interruption may also lead to uncertainty about whether operations were successfully completed, e.g., verification of rewritten or relocated data, marking of bad sectors, etc. These and other effects of power loss may lead to data corruption and/or loss. One way to deal with power loss during data recovery is to create and save journal data on the media being recovered, e.g., on the magnetic disks where the device being recovered is a hard disk drive. This approach may result in added complexity, and may also increase in the amount of time spent on the overall recovery operation.

Instead of using the primary storage media for storing journal data, a non-volatile cache (NVC) on a data storage device may be used. In this context NVC may refer to a region in NVRAM that can be accessed directly. The term NVC may also refer to a region in volatile memory (RAM) that is backed up by an NV region with equivalent size in a solid state device such as NAND or NOR flash. Due to the high speed of the NVC and the ability to write directly from disk to NVC, the data repair and reallocation procedures may be simplified and shortened compared to using primary storage media (e.g., magnetic disks) for this purpose.

In reference now to FIG. 1, a block diagram illustrates an apparatus 102 that includes data recovery features according to an example embodiment. The apparatus 102 may be configured as a conventional or hybrid hard disk drive. The apparatus 102 includes storage media 104 that includes one or more magnetic disks 106. The disks 106 store data as magnetic patterns that are read by sensors (e.g., magnetic read/write sensors) mounted on a pivoting arm assembly 108. A controller 110 is coupled to the arm assembly for both controlling movement of the arm via an actuator (not shown) and sending and receiving signals to one or more read/write heads on the arms. While this embodiment shows a rotating magnetic storage media 104, the concepts described below may be applicable to alternate storage media.

The apparatus 102 includes a host interface 112 that communicatively couples the apparatus 102 to a host 114. The host interface 112 at least provides a mechanism that allows the host 114 to store and retrieve information to/from the media 104. The host interface 112 may utilize standard communication interfaces and protocols, such as SATA, SCSI, eSATA, SAS, USB, etc. The host interface 112 provides both a standard means of communication between the apparatus 102 and host 114, as well as abstracting operations of the controller 110 and media 106. For example, the host 114 may access data by way of logical block addresses (LBAs) that are mapped internally to a different physical addressing scheme, e.g., based on cylinders, heads, and sectors. The physical addressing scheme is used internally by the controller 110 for performing read and write operations requested by the host 114, which uses LBAs in the requests.

The controller 110 may utilize various internal adaptations of the apparatus 102 to improve performance or otherwise provide efficient operation with the host 114. For example, the apparatus 102 may include a volatile random-access memory (RAM) 116, such as Dynamic-RAM (DRAM), and an NVRAM 118, such as NAND flash memory. These memory devices 116, 118 may have a number of different uses, such as acting as temporary and permanent stores for data needed by the controller 110 during operation. The memory devices 116, 118 may also be used for caching host data, as represented by respective caches 120, 122.

Data retrieved from media 104 or stored to media 104 can be held in one or more caches 120, 122 to improve throughput. The caches 120, 122 have faster access and retrieval times than the media 104, although generally with less storage capacity. While there is also some processing overhead in maintaining the one or more caches 120, 122, the faster media used by the cache can significantly improve performance of the apparatus 102 under many conditions.

In the present disclosure, a portion of the NVRAM cache 122 is used to store a recovery journal 126. In one configuration, this region 126 may be accessed via an equivalent region 124 volatile RAM 116. In this configuration, regions within volatile RAM 116 may be backed up by regions with equivalent sizes in the NVRAM 118. In such an arrangement, a power loss event will trigger data transfer (back-up) from volatile RAM 116 to NVRAM 118 powered by back EMF or other means. In other arrangements, the recovery journal 126 may be stored in a region of the NVRAM 118 directly accessible by the controller 110. In such a case, there may be no corresponding region 124 within the volatile RAM 116. For purposes of the following discussion, only reference to the region 126 storing journal in NVRAM 118 will be referenced, although the discussion may be equally applicable to configurations where the volatile region 124 is mapped to the non-volatile region 126.

By using the NV cache 122 (or other available portion of NVRAM 118), data repair and reallocation procedures for apparatus 102 may be simplified and/or shortened. This may be true even where the storage media 104 is solid-state memory. In such a configuration, the NVRAM 118 may utilize faster and/or more reliable memory than the main media 104 for purposes of read/write caching. As a result, logging recovery operations in the NVRAM journal 126 instead of solid-state media 104 may provide similar advantages as described herein when such a journal is used in a device with magnetic disks 106.

The proposed solution is described below in three parts: a) journal data region allocation and initialization; b) disc data repair and reallocation; and c) power loss recovery. In reference now to FIG. 2, a flowchart illustrates a procedure for journal data region allocation and initialization according to an example embodiment. The procedure on FIG. 2 begins in response to a power-on initialization event 202. This event 202 may include a change from power-off to power-on states, or may be triggered by a hardware reset which occurs without power being interrupted.

In response to the event 202, the apparatus will check 204, 206 to determine whether a dedicated journal region 126 is statically or dynamically allocated in NVRAM 118 for journal data. In this example, the check 204, 206 determines whether some data (e.g., a journal header) is recorded at a predetermined location 205 in the NVRAM 118. This location 205 may be fixed by the manufacturer, determined from a lookup table, etc. In this example, the header location 205 is at a beginning portion of the region 126 that is dedicated to journal storage, although other arrangements may also be possible. For example, the header location 205 may be at a fixed location, and the header may store, among other things, a dynamically settable address (or range of addresses) that indicates where the journal entries (if any) are stored.

If the result of the determination at 206 is that if there is no journal header written, then the region 126 is initialized 208. Initialization 208 may include, among other things, writing a header into location 205, and preparing, erasing, and/or writing initialization data to some or all of region 126. Because the region 126 was not previously initialized, it may be assumed that it was not used to store journaling data, and so the routine exits 210 after initialization 208 is complete.

If the result of the determination 206 is that there is a journal header written, then the apparatus will check 212, 214 whether or not recovery steps are still written, indicating that a recovery was in progress, but was interrupted before it could be completed. In this example, the determination 212, 214 is made by looking at a portion of region 213 separate from the header 205, although such information could alternately be contained in the header 205. In the event that the result of determination 214 is that no recovery steps were found, then the procedure exits at 216. If the result of determination 214 is that recovery steps were found, the recovery is resumed 218, as will be described in greater detail below. If the recovery 218 is successfully completed, the device will change/remove journaling steps from region 126, so that in response to the next power-on initialization 202, block 214 of the procedure will return "no," and subsequently exit 216.

For particular steps of disc data repair and reallocation, contextual information of the current step is used to create a journal entry. The journal entry is saved by inserting/appending the entry to the allocated journal data region of the NVC. The journal data may include a range of logical block address (LBA) of sectors operated on, user data associated with sectors operated on, and data indicating the beginning of the current step. As part of the disc repair, a scrub may be first performed on affected sectors of the disc media, and data in the affected sectors is verified. If reallocation is needed for any sector, then the identified sectors are reallocated to spare locations and reallocation is updated (e.g., update logical-tophysical address mapping). The journal region of the NVC can then be cleared, invalidated and/or re-initialized for next use.

Figure 3:
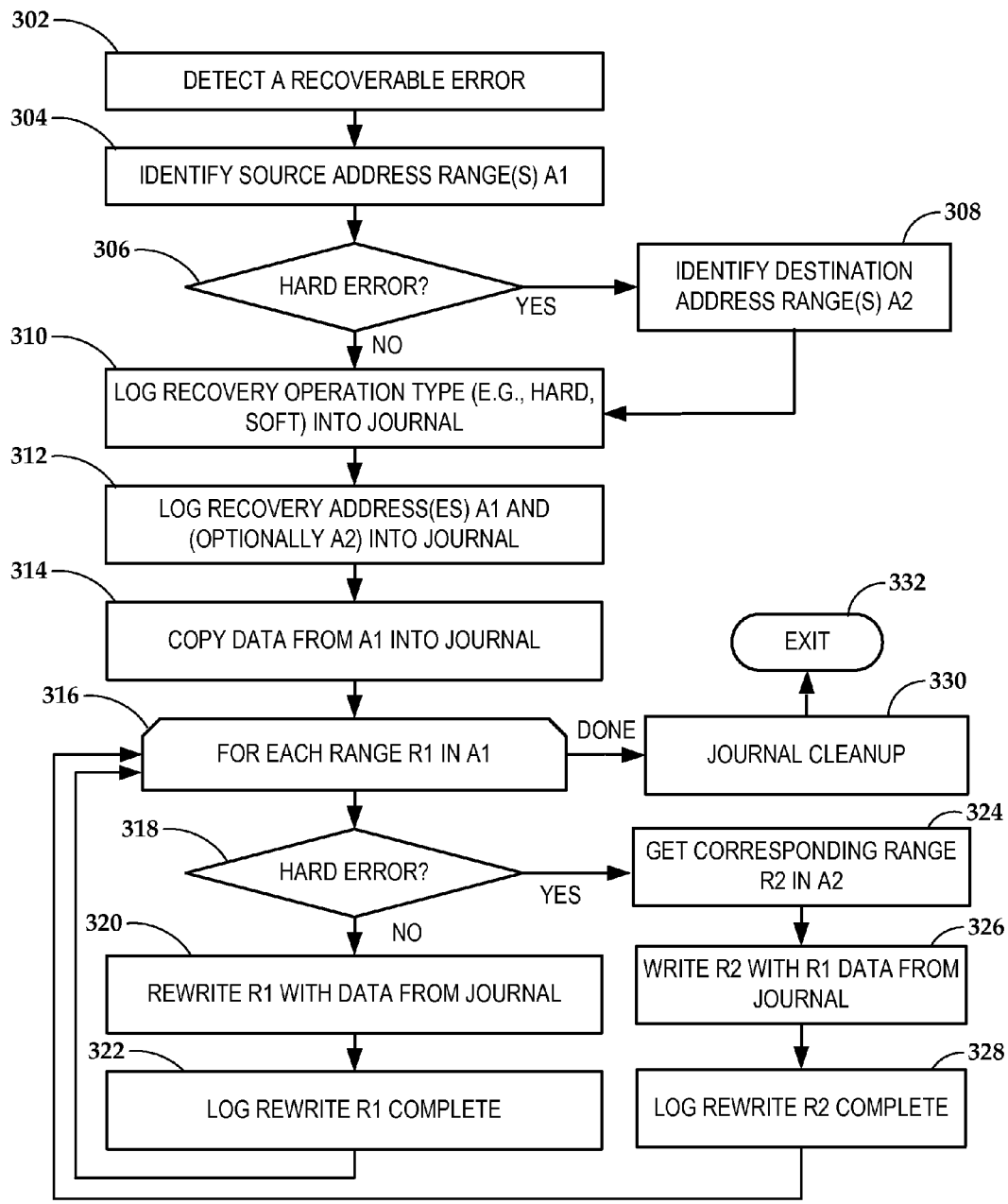
FIG. 3 is a flowchart of a procedure for data repair and/or reallocation with non-volatile cache journaling according to an example embodiment.

In reference now to FIG. 3, a flowchart illustrates a procedure for data repair and/or reallocation with non-volatile cache journaling according to an example embodiment. At block 302, a recoverable error is detected. The error may be a soft or a hard error, and may be detected in response to any event, such as normal data read, write, and/or erase operations, background scanning of media, diagnostic procedures, etc. In response to the detected error, a set of addresses A1 is identified 304. The addresses A1 may include any combination of individual addresses (e.g., 0x0010, 0x002A, . . . ), starting and ending addresses of ranges (0x0010-0x0014), or/or address/block size pairs (0x0010, 5). The data repair and reallocation procedure may be performed on single sector or range of sectors, and so identification at 304 may involve identifying more than one address each associated with a different sectors or range of sectors.

At block 306, the apparatus determines whether the error detected at block 302 is a hard error or soft error. The type of error determined at block 306 may be applicable to all addresses of A1, or individual addresses within A1 may be associated with a different class of error. Generally, the system may not know beforehand if an error is hard or soft, and recovery may involve a first pass where all sectors of A1 are treated as being soft errors. If the attempted recovery of any sectors results in continued error, then a second pass of the procedure may be performed on those sectors, this time treating all errors as hard errors.

If it is determined at block 306 that the error is a hard error, then target addresses A2 are determined at 308, each address/range in A2 corresponding to an address of A1 from which data will be relocated. This operation 308 may involve identifying and preparing unused or available memory at A2 that can be used to relocate the data currently being stored in A1. At block 310, a general description (e.g., type of recovery, start date-time, etc.) of the current recovery operation is logged, e.g., in a journal header, new journal entry, or anywhere else available in the NVC or NVRAM reserved for such purposes. At block 312, the addresses A1 (and addresses A2, if used) are also logged into the journal, and data associated with address(es) A1 is copied to the journal at block 314.

Block 316 represents the entry point of a loop which is iterated over at least a range R1 of data units (e.g., sectors) associated with A1. For purposes of this example, it may be assumed that each R1 represents a region of contiguous data (e.g., adjacent sectors) which can be efficiently operated on in a single operation. In other arrangements, it may be preferable to treat each sector as an individual range, or to group non-adjacent sectors together. The operations performed on the range R1 depend on a determination 318 of whether the recovery operation is in response to a hard or soft error.

For soft errors, the data in R1 is rewritten 320 with data retrieved from the journal, and completion of the rewrite operation is logged 322. Logging 322 of completion may involve adding an entry, or removing a previously entry associated with R1. For example, an address logged to the journal at step 312 associated with R1 may be removed at 322. In another arrangement, block 320 may involve logging start of the rewrite operation at range R1 to the journal, and appending another entry to indicate the rewrite at R1 was completed. The rewriting 320 may include read-back validation to ensure the error was successfully corrected. If this validation fails, the result may also be logged at 322 for further action (e.g., to be later treated as a hard error).

If the indication at block 318 is of a hard error, then a corresponding range R2 of A2 may be determined 324. Range R2 may be determined based on a mapping performed at 308, where A2 was determined based on A1. The data from R1 is retrieved from the journal and written 326 to R2, and range R1 may be invalidated (not shown) to prevent further use. The completion of the write 326 is logged 326 to the journal. The logging 328 of the completion of the operation 326 may be performed as described above for block 322, including indication of whether the operation 326 was successful or failed. Upon iteration of all the ranges in A1, the journal can be cleaned up 330 and the procedure is complete 332. The cleanup 330 may involve adding a journal entry indicating that all steps were completed, clearing any and all data associated with the recovery operation, invalidating and/or re-initializing the journal data region for next use, etc.

Generally, power loss or other interruption (e.g., hard reset) during or between any steps in FIG. 3 should result it an incomplete journal that enables resumption of the recovery operation after the next power-on initialization. Power loss recovery for interrupted data repair and reallocation is started when the disc drive is in ready state after completion of power-on initialization. In reference now to FIG. 4, a flowchart illustrates a procedure for power loss recovery according to an example embodiment.

Figure 2:
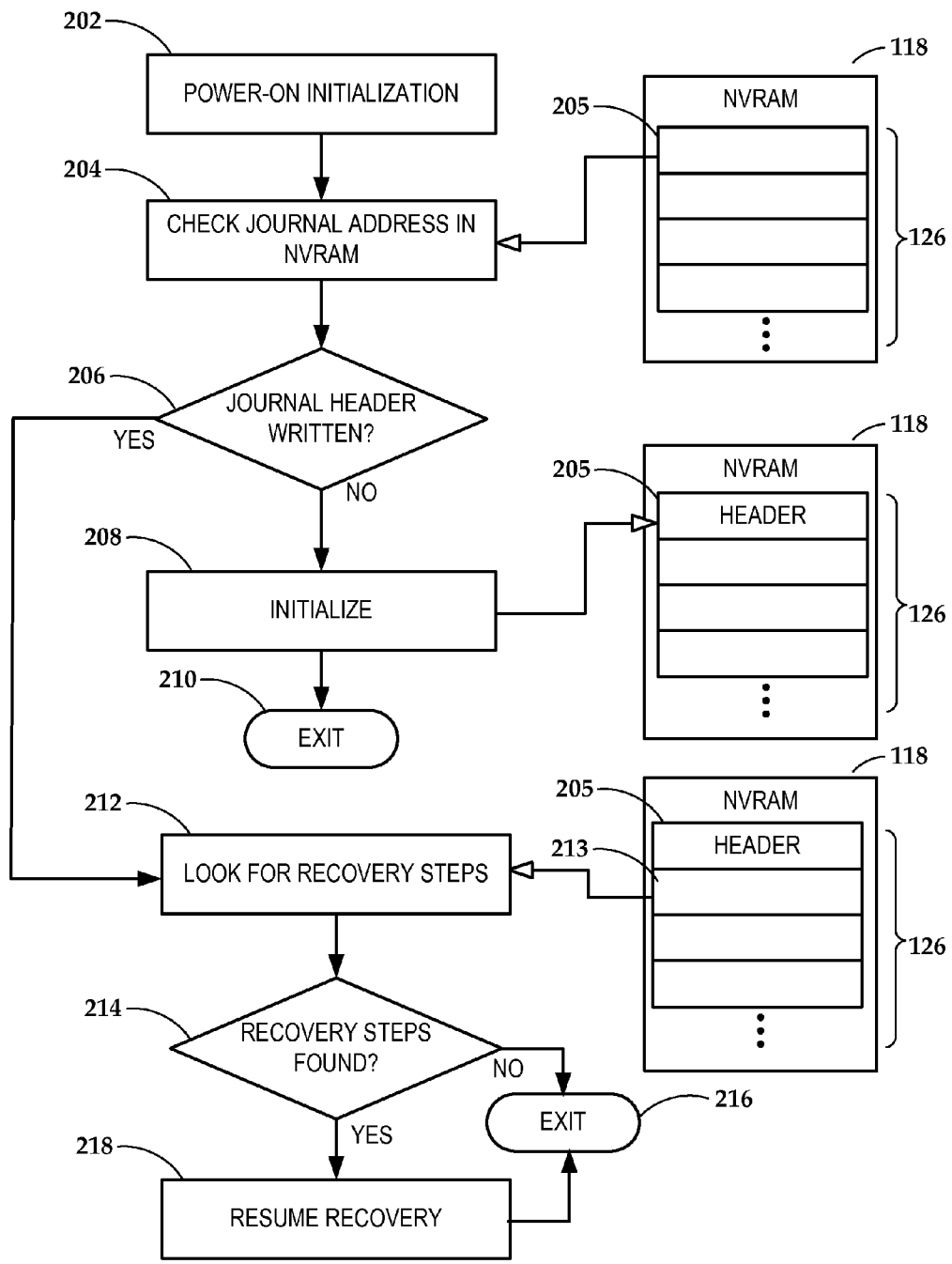
FIG. 2 is a flowchart of a procedure for journal data region allocation and initialization according to an example embodiment.
Figure 4:
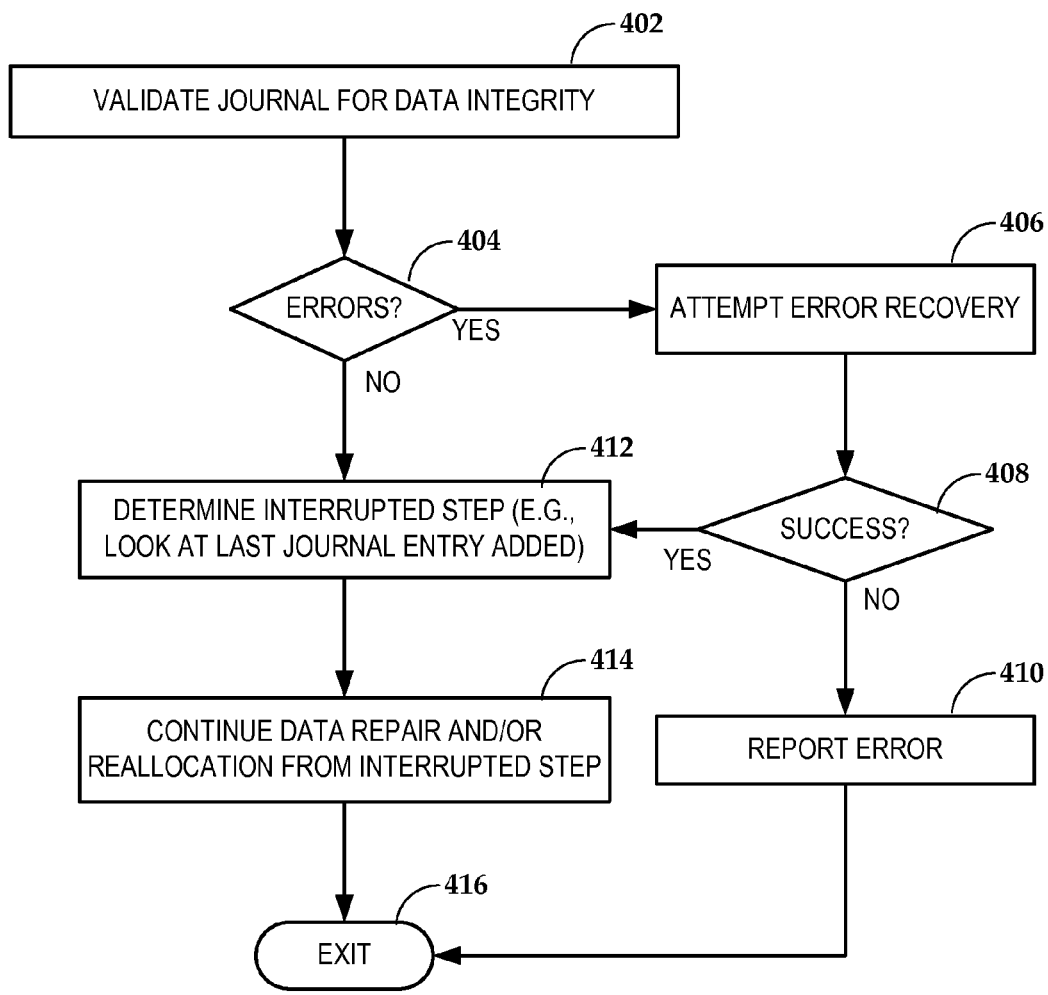
FIG. 4 is a flowchart of a procedure for power loss recovery according to an example embodiment.

The procedure in FIG. 4 may be triggered by a power-on initialization procedure (e.g., block 218 in FIG. 2). The process begins with validating 402 the journal for integrity. This validation 402 may include checking for consistency of the entries (e.g., expected order and syntax of recovery steps) as well as checking for data corruption (e.g., verifying checksums and/or error correction codes) of both the journal entries and user data stored as part of the recovery. If it is determined 404 that the journal has errors, a recovery of the journal 406 may be attempted. For example, if a journal entry describing one step is corrupted, other data may still be available to allow recovery to be attempted, e.g., starting the entire recovery over from the start. If it is determined 408 that the journal cannot be recovered, then the error may be reported 410 to the host, which may in turn communicate the error to the user. In response to the error report 410, the user may wish to undertake a manual validation and recovery on the storage device to detect and fix the previously detected error.

If it has been determined 404 that the journal has no errors or if it has been determined 408 that a journal with errors has been recovered, the interrupted step is determined 412. This determination 412 may be made, for example, by extracting the information from the last journal entry data added. Based on this information, data repair and reallocation procedures continue 414 from the last interrupted step. This may involve entering an appropriate block within a procedure such as shown in FIG. 3.

Figure 5:
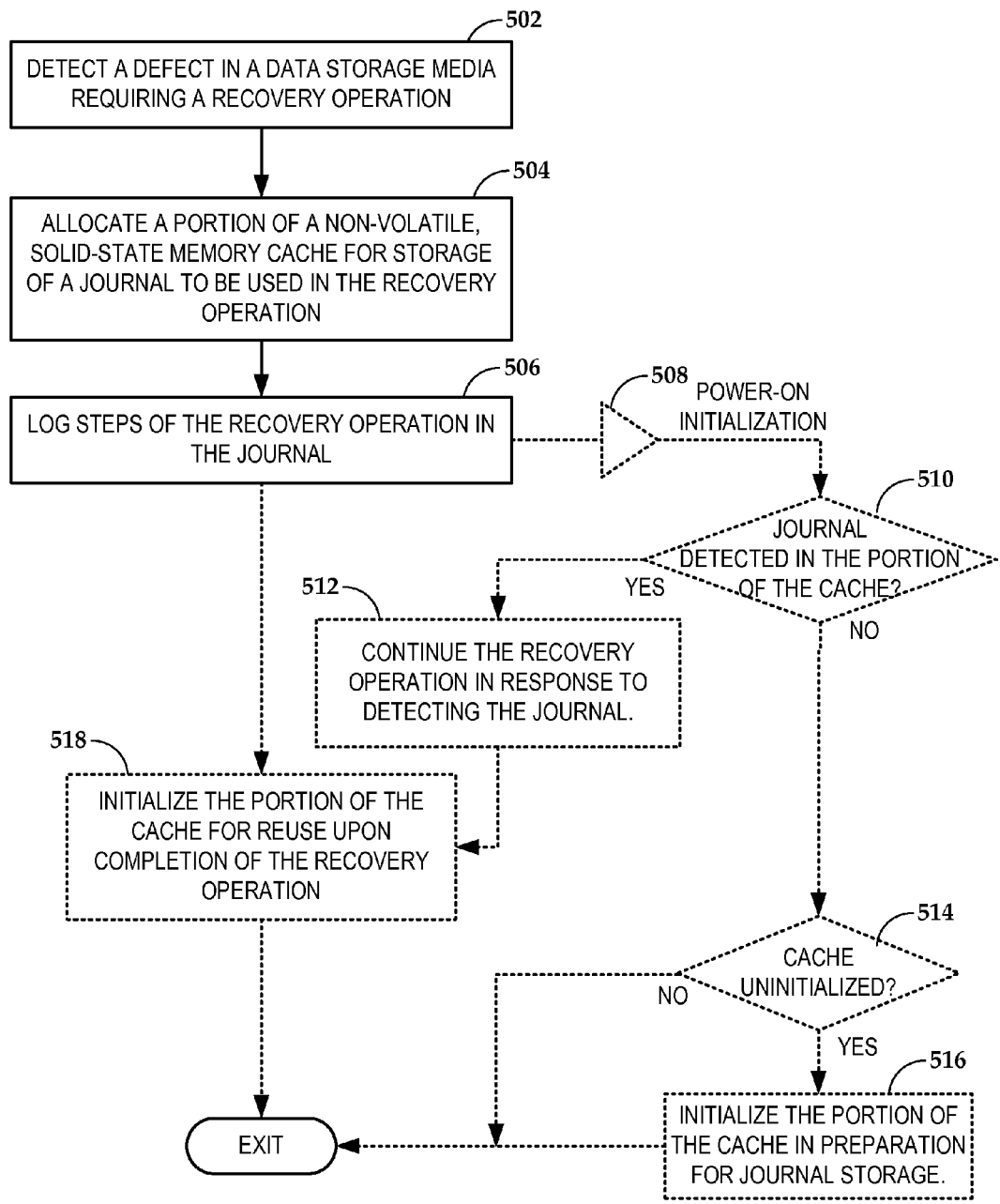
FIG. 5 is a flowchart of a procedure according to another example embodiment.

In reference now to FIG. 5, a flowchart illustrates a procedure according to an example embodiment. The procedure may be implemented by firmware of a hard disk drive or similar apparatus. The procedure involves detecting 502 a defect in a data storage media requiring a recovery operation. A portion of a cache (e.g., non-volatile, solid-state memory cache) is allocated 504 for storage of a journal to be used in the recovery operation. Steps of the recovery operation are logged 506 in the journal. The recovery operation may involve reallocation of data from a defective portion of the disk storage to a free portion of the disk storage. Logging the steps of the recovery operation may involve storing journal data that includes any combination of: a range of logical block address operated on by the recovery operation; user data associated with sectors operated on by the recovery operation; and an indicator of at least one step currently being performed in the recovery operation.

The recovery operation 506 (or any other operation shown in FIG. 5) may optionally be interrupted by a power-on initialization event 508. In such a case, an attempt may be made to detect 510 a journal in the portion of the cache, in which case the recovery operation may optionally be continued 512 in response to detecting the journal. This continuation 512 may involve determining an interrupted step of the recovery operation based on entries logged in the journal, and continuing the recovery operation at the interrupted step.

If the journal is not detected at 510, another determination 514 may optionally be made to determine if the cache is unused but uninitialized. If so, the portion of the cache is initialized 516 in preparation for journal storage. Similarly, if recovery operations associated with blocks 506 or 512 successfully complete, the portion of the cache may optionally be initialized 518 for reuse upon completion of the recovery operation.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing error recovery in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
a controller capable of being coupled to a magnetic data storage media and a non-volatile, solid-state, cache, the controller configured to:
in response to reading data previously stored on the magnetic data storage media, detect a defect in the data requiring a recovery operation;
allocate a portion of the cache for storage of a journal to be used in the recovery operation; and
log steps of the recovery operation to the journal.

2. The apparatus of claim 1, wherein the controller is further configured to:
attempt to detect the steps in the journal in response to a power-on initialization of the apparatus, the existence of the steps in the journal indicating the recovery operation was interrupted; and
continue the recovery operation in response to detecting the steps.

3. The apparatus of claim 2, wherein the controller is further configured to detect that the portion of the cache is uninitialized in response to the power-on initialization of the apparatus, and in response thereto initialize the portion of the cache in preparation for journal storage.

4. The apparatus of claim 2, wherein continuing the recovery operation comprises:
determining an interrupted step of the recovery operation based on entries logged to the journal; and
continuing the recovery operation at the interrupted step.

5. The apparatus of claim 1, wherein the controller is further configured to initialize the portion of the cache for reuse upon completion of the recovery operation.

6. The apparatus of claim 1, wherein the recovery operation comprises reallocation of the data from a defective portion of the data storage media to a free portion of the data storage media.

7. The apparatus of claim 1, wherein the recovery operation comprises refreshing the data stored on the data storage media.

8. The apparatus of claim 1 wherein logging the steps of the recovery operation comprise storing journal data comprising:
a journal header;
a description of the recovery operation; and
an indicator of at least one step currently being performed in the recovery operation.

9. A method comprising:
in response to reading data stored in the magnetic data storage media, detecting a defect in the data requiring a recovery operation;
allocating a portion of a non-volatile, solid-state, cache for storage of a journal to be used in the recovery operation; and
logging steps of the recovery operation to the journal.

10. The method of claim 9, further comprising:
attempting to detect the steps in the journal in response to detecting a power-on initialization, the existence of the steps in the journal indicating the recovery operation was interrupted; and
continuing the recovery operation in response to detecting the steps.

11. The method of claim 10, further comprising:
detecting that the portion of the cache is uninitialized in response to the power-on initialization; and
in response thereto, initializing the portion of the cache in preparation for journal storage.

12. The method of claim 10, wherein continuing the recovery operation comprises:
determining an interrupted step of the recovery operation based on entries logged to the journal; and
continuing the recovery operation at the interrupted step.

13. The method of claim 9, further comprising initializing the portion of the cache for reuse upon completion of the recovery operation.

14. The method of claim 9, wherein the recovery operation comprises reallocation of the data from a defective portion of the data storage media to a free portion of the data storage media.

15. The method of claim 9, wherein the recovery operation comprises refreshing the data stored on the data storage media.

16. The method of claim 9, wherein logging the steps of the recovery operation comprise storing journal data comprising:
a journal header;
a description of the recovery operation; and
an indicator of at least one step currently being performed in the recovery operation.

17. The method of claim 9, wherein the method is implemented by firmware of a hard disk drive.

18. An apparatus comprising:
a controller capable of being coupled to a magnetic data storage media and a non-volatile, solid-state, cache, the controller configured to:
determining one or more addresses ranges associated with sectors of the data storage media requiring a recovery operation;
allocate a portion of the cache for storage of a journal to be used in the recovery operation;
log the address ranges to the journal; and
for each range of the address ranges, perform the recovery operation on the range and log a completion of the recovery operation to the journal.

19. The apparatus of claim 18, wherein the controller is further configured to log user data associated with the address ranges to the journal.

20. The apparatus of claim 1, wherein the portion of the cache is dedicated to journal storage.

\* \* \* \* \*